United States Patent
Nandlinger

(10) Patent No.: US 11,755,062 B2
(45) Date of Patent: *Sep. 12, 2023

(54) PROCESSING SYSTEM, RELATED INTEGRATED CIRCUIT, DEVICE AND METHOD

(71) Applicant: STMicroelectronics Application GMBH, Dornach (DE)

(72) Inventor: Rolf Nandlinger, Herrsching (DE)

(73) Assignee: STMICROELECTRONICS APPLICATION GMBH, Aschheim-Dornach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/933,680

(22) Filed: Sep. 20, 2022

(65) Prior Publication Data

US 2023/0013396 A1    Jan. 19, 2023

Related U.S. Application Data

(63) Continuation of application No. 16/857,544, filed on Apr. 24, 2020, now Pat. No. 11,480,994.

(51) Int. Cl.
G06F 1/14        (2006.01)

(52) U.S. Cl.
CPC ..................... *G06F 1/14* (2013.01)

(58) Field of Classification Search
CPC .......................................................... G06F 1/14
See application file for complete search history.

(56) References Cited

U.S. PATENT DOCUMENTS

| | | |
|---|---|---|
| 2006/0069939 A1 | 3/2006 | Fredriksson et al. |
| 2009/0309031 A1* | 12/2009 | Ohtani ............... A61B 6/037 250/363.03 |
| 2013/0042135 A1 | 2/2013 | Lopez-Aguado et al. |
| 2015/0003443 A1 | 1/2015 | Koenigseder et al. |

OTHER PUBLICATIONS

Webermann, Hauke "CAN Send and Receive with Hardware Timestamping", XP055657065, https://esd.eu/sites/default/files/paper_16_icc_timestamping_hauke_webermann1.pdf., Mar. 8, 2017, 3 pages.
Wikipedia, "System time", https://en.wikipedia.org/wiki/System_time, printed May 7, 2020, 6 pages.
Wikipedia, "Network Time Protocol", https://en.wikipedia.org/wiki/ Network_Time_Protocol#Timestamps, 9 pages, printed Apr. 24, 2020.

* cited by examiner

Primary Examiner — Zahid Choudhury
(74) Attorney, Agent, or Firm — Slater Matsil, LLP

(57) ABSTRACT

A processing system includes a digital processing unit programmable as a function of a firmware stored to a non-volatile memory and a resource connected to the digital processing unit via a communication system. The processing system also includes a time reference circuit including a first digital counter circuit to generate, in response to a clock signal, a system time signal including a plurality of bits indicative of a time tick-count, and a time base distribution circuit to generate a time base signal by selecting a subset of the bits of the system time signal, wherein the time base signal is provided to the resource. The resource detects a given event, stores the time base signal to a register in response to the event, and signals the event to the digital processing unit. The digital processing unit reads, via the communication system, the time base signal from the register.

20 Claims, 9 Drawing Sheets

PROCESSING SYSTEM, RELATED INTEGRATED CIRCUIT, DEVICE AND METHOD

CROSS-REFERENCE TO RELATED APPLICATIONS

This application is a continuation of U.S. patent application Ser. No. 16/857,544, filed Apr. 24, 2020, which application claims the benefit of Italian Patent Application No. 102019000006633, filed on May 8, 2019, which applications are hereby incorporated herein by reference.

TECHNICAL FIELD

Embodiments of the present disclosure relate to the time management within processing systems, such as micro-controllers.

BACKGROUND

FIG. 1 shows a typical electronic system, such as the electronic system of a vehicle, comprising a plurality of processing systems 10, such as embedded systems or integrated circuits, e.g. a Field Programmable Gate Array (FPGA), a Digital Signal Processor (DSP) or a micro-controller (e.g., dedicated to the automotive market).

For example, in FIG. 1 are shown three processing systems $10_1$, $10_2$ and $10_3$ connected through a suitable communication system 20. For example, the communication system may include a vehicle control bus, such as a Controller Area Network (CAN) bus, and possibly a multimedia bus, such as a Media Oriented Systems Transport (MOST) bus, connected to vehicle control bus via a gateway. Typically, the processing systems 10 are located at different positions of the vehicle and may include, e.g., an Engine Control Unit (ECU), a Transmission Control Unit (TCU), an Anti-lock Braking System (ABS), a body control modules (BCM), and/or a navigation and/or multimedia audio system.

Future generations of processing systems, in particular micro-controllers dedicated to automotive applications, will exhibit a significant increase in complexity, mainly due to the increasing number of functionalities (such as new protocols, new features, etc.) and to the tight constraints concerning the operation conditions of the system (such as lower power consumption, increased calculation power and speed, etc.).

FIG. 2 shows a block diagram of an exemplary digital processing system 10, such as a micro-controller, which may be used as any of the processing systems 10 of FIG. 1.

In the example considered, the processing system 10 comprises at least one processing unit 102, such as a microprocessor, usually the Central Processing Unit (CPU), programmed via software instructions. Usually, the software executed by the processing unit 102 is stored in a program memory 104, such as a non-volatile memory, such as a Flash memory or EEPROM. Generally, the memory 104 may be integrated with the processing unit 102 in a single integrated circuit, or the memory 104 may be in the form of a separate integrated circuit and connected to the processing unit 102, e.g. via the traces of a printed circuit board. Thus, in general the memory 104 contains the firmware for the processing unit 102, wherein the term firmware includes both the software of a micro-processor and the programming data of a programmable logic circuit, such as a FPGA.

In the example considered, the processing unit 102 may have associated one or more resources 106 selected from the group of:

- one or more communication interfaces IF, e.g. for exchanging data via the communication system 20, such as a Universal asynchronous receiver/transmitter (UART), Serial Peripheral Interface Bus (SPI), Inter-Integrated Circuit ($I^2C$), Controller Area Network (CAN) bus, and/or Ethernet interface, and/or a debug interface; and/or
- one or more analog-to-digital converters AD and/or digital-to-analog converters DA; and/or
- one or more dedicated digital components DC, such as hardware timers and/or counters, or a cryptographic co-processor; and/or
- one or more analog components AC, such as comparators, sensors, such as a temperature sensor, etc.; and/or
- one or more mixed signal components MSC, such as a PWM (Pulse-Width Modulation) driver.

Accordingly, the digital processing system 10 may support different functionalities. For example, the behavior of the processing unit 102 is determined by the firmware stored in the memory 104a, e.g., the software instructions to be executed by a microprocessor 102 of a micro-controller 10. Thus, by installing a different firmware, the same hardware (micro-controller) can be used for different applications.

As mentioned before, the processing systems 10 may control different operations of the vehicle, wherein the processing systems 10 may be located at different positions in the vehicle and each processing system 10 may implement one or more functions/operations. Many of these functions/operations have to be execute in real-time. For example, the engine control is subject to thermodynamic laws that should be balanced with the real-time state of the vehicle. Typically, the real time state of the vehicle is monitored via sensors, which may be connected directly to the processing system 10 implementing the Engine Control Unit (ECU) or to other processing systems 10 of the vehicle. Similarly, in order to control/command the operation the motor, the Engine Control Unit (ECU) has to control/command one or more actuators, e.g. in order to inject the fuel, open a valve for gas discharge etc., which may be connected directly to the processing system 10 implementing the Engine Control Unit (ECU) or to other processing systems 10 of the vehicle.

Thus, in many applications, the execution of a first operation within a processing system 10 has to be synchronized with the execution of a second operation within the same processing system 10 or within a further processing system 10.

SUMMARY

In view of the above, it is an objective of various embodiments of the present disclosure to provide solutions for generating a time reference within a processing system and for distributing this time reference to one or more circuits of the processing system.

According to one or more embodiments, one or more of the above objectives is achieved by means of a processing system having the features specifically set forth in the claims that follow. Embodiments moreover concern a related integrated circuit, device and method.

The claims are an integral part of the technical teaching of the disclosure provided herein.

As mentioned before, various embodiments of the present disclosure relate to a processing system. In various embodiments, the processing system, such as an integrated circuit, comprises a digital processing unit programmable as a function of a firmware stored to a non-volatile memory and a resource connected to the digital processing unit via a communication system. For example, the processing system may be a microcontroller and the digital processing unit may be a microprocessor of the microcontroller.

In various embodiments, the processing system comprises moreover a time reference circuit comprising a first digital counter circuit configured to generate, in response to a clock signal, a system time signal comprising a plurality of bits indicative of a time tick-count. For example, in various embodiments, the first digital counter circuit of the time reference circuit is configured to generate the system time signal by increasing the value of the system time signal by a given amount in response to the clock signal. In various embodiments, this given amount may be programmable by means of the processing unit.

In various embodiments, the processing system comprises moreover a time base distribution circuit configured to generate a time base signal by selecting a subset of the bits of the system time signal. For example, in various embodiments, the time base distribution circuit is configured to generate a time base signal by selecting a first subset of a given number of bits of the system time signal when a selection signal has a first value, and a second subset of the given number of bits of the system time signal when the selection signal has a second value, whereby the time resolution of the time base signal varies as a function of the selection signal.

In various embodiments, the time base signal is provided to the resource. In this case, the resource may be configured to detect a given event, store the time base signal to a register in response to the event, and signal the event to the digital processing unit. Accordingly, the digital processing unit may, in response to the event having been signaled by the resource, read via the communication system the time base signal from the register.

For example, the resource may be an analog-to-digital converter and the event may correspond to the completion of an analog-to-digital conversion, and/or the resource may be a communication interface and the event may correspond to the reception of data via the communication interface.

In various embodiments, the time reference circuit may also comprise further circuits.

For example, in various embodiments, the time reference circuit comprises an extended timer circuit comprising a second digital counter circuit configured to generate, in response to the clock signal or a trigger signal generated as a function of the clock signal, an extended system time signal comprising a number of bits being greater than the number of bits of the system time signal, wherein the extended system time signal is readable by means of the digital processing unit.

In various embodiments, the time reference circuit comprises an operation time counter circuit comprising a plurality of third digital counter circuits configured to generate, in response to the clock signal or a trigger signal generated as a function of the clock signal, respective count values, wherein each of the plurality of third digital counter circuits may be reset, started and stopped by the digital processing unit.

Finally, in various embodiments, the time reference circuit may comprise a trigger generator circuit comprising one or more fourth digital counter circuits configured to generate, in response to the clock signal or a trigger signal generated as a function of the clock signal, at least one trigger signal.

BRIEF DESCRIPTION OF THE DRAWINGS

Embodiments of the present disclosure will now be described with reference to the annexed drawings, which are provided purely by way of non-limiting example and in which.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
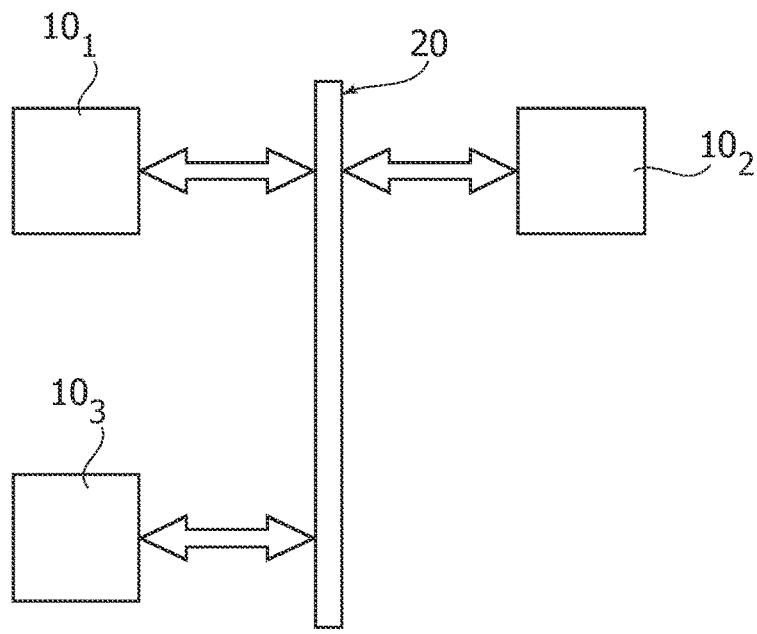
FIG. 1 shows a typical electronic system.
Figure 2:
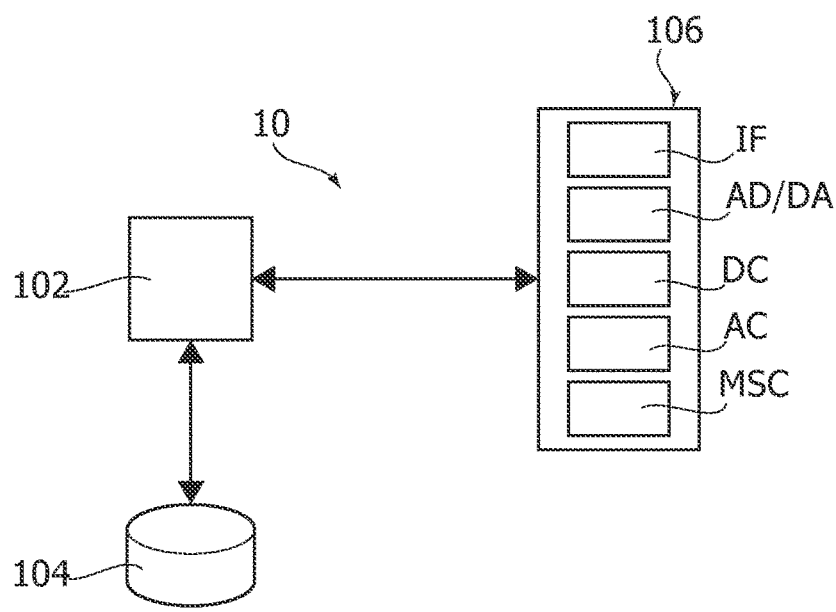
FIG. 2 shows a typical processing system of the electronic system of FIG. 1.

In the following FIGS. 3 to 20 parts, elements or components which have already been described with reference to FIGS. 1 and 2 are denoted by the same references previously used in such Figures; the description of such previously described elements will not be repeated in the following in order not to overburden the present detailed description.

As described in the forgoing with respect to FIGS. 1 and 2, in many applications, the execution of a first operation within a processing system 10 has to be synchronized with the execution of a second operation within the same processing system 10 or within a further processing system 10.

For example, in many applications the data/message exchange with one or more of the resources 106 of the processing system 10, which e.g. may include information such as status data, sensor data, actuator commands, etc., should be linked to some kind of time reference/time stamp. For a temporal correlation of these functions/operations a common time base is thus required. For example, the conventional approach to this request consists in implementing some time reference within each processing systems 10 configured to execute synchronized operations, wherein the time reference circuit provides a global system time for the respective processing system 10. For example, this internal time reference circuit may be implemented with a timer circuit or a real-time-clock.

For example, a processing system 10 may acquire sensor data from a sensor via an analog-to-digital converter, ADC (see also block AD in FIG. 2). Typically, for this purpose, the ADC is configured to generate an interrupt for the processing unit 102 when the A/D conversion is completed. In response to this interrupt, the processing unit 102, such as a microprocessor programmed via software instructions, may read the digital sample provided by the ADC and read also the global system time from the reference circuit, thereby associating a sampling time/time stamp with the digital sample for the sensor data. Similar interrupts indicating given events, which should then be associated with a given time stamp, may also be generated by other resources 106 of the processing system 10, such as a communication interface generating an interrupt on reception of a message (such as a status message or an actuation command), a timer circuit, etc.

The time stamping, i.e. the acquiring of the global system time and association of this time to a given event, may thus be performed by the processing unit 102, e.g. via software instructions, e.g. by means of an operating system installed on the processing unit 102. However, such software generated time stamps associated with given events/interrupts signaled by one or more of the resources 106 may have only a coarse accuracy related to the point of time when the event/interrupt has been received or generated, e.g. because they need to be transferred first through several software layers before a software time stamp is added. This delay may thus have a negative impact on the real-time behavior of the overall system and therefore the delay and the variation on the delay should be as small as possible.

Figure 3:
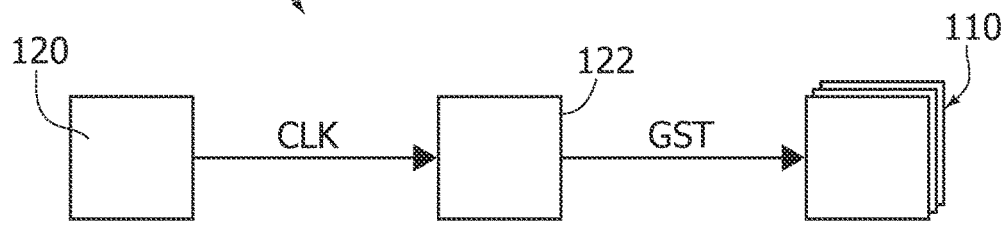
FIG. 3 shows an embodiment of a processing system comprising a timer reference circuit configured to generating a system time signal and a circuit configured to use the system time signal.

FIG. 3 shows an embodiment of a processing system 10a in accordance with the present description.

In the embodiment considered, the processing system 10a comprises a time reference circuit 122 configured to generate a time reference signal GST, which is provided to a plurality of circuits 110 of the processing system 10a. Generally, the circuit 110 may be any circuit of the processing 10a requiring a reference time. For example, reference can be made to the description of the processing system 10 shown in FIG. 2. For example, the circuit 110 may be a processing unit 102 or one of the resources 106 shown in FIG. 2. Preferably, the time reference circuit 122 and the circuit(s) 110 are integrated in the same integrated circuit.

Specifically, in the embodiment considered, the time reference circuit 122 is configured to generate the signal GST in response to a clock signal CLK provided by an oscillator circuit 120. Generally, the oscillator circuit 120 may be integrated in the integrated circuit of the processing system 10a or may be at least in part be connected to a pin of the integrated circuit of the processing system 10a. For example, in various embodiments, the oscillator circuit 120 may be implemented with an external reference oscillator and an internal phase-locked loop (PLL).

Thus, generally, the time reference circuit 122 receives at input a clock signal CLK and generates the time reference signal GST. Specifically, in various embodiments, the time reference signal GST is not a mere binary trigger signal but corresponds to a data signal having a plurality of bits, wherein the value of the time reference signal GST represents a system time. For example, the time reference signal GST may have 32 or 64 bits.

Specifically, in various embodiments, the circuit 122 is configured to increase the time reference signal GST in response to the clock signal CLK, such that the time reference signal GST corresponds to the number of "ticks" that have transpired since a given starting date, usually called epoch. Generally, the epoch may be a fixed date, e.g. 1 Jan. 1970 00:00:00 UT similar to the Unix system time or 1 Jan. 1601 00:00:00 UT similar to a Windows based system time, or variable, e.g. from the switch on of the processing system 10a.

For example, reference can be made to the webpage https://en.wikipedia.org/wiki/System_time for possible encoding schemes of a system time, which may also be applied to the time reference signal GST.

Accordingly, from a circuit point of view, each tick determined as a function of the clock signal CLK corresponds to a given period/time, such as 100 ns or 1 ms, and the (count) value of the signal GST may be used, e.g., to trigger given operations within the circuits 110. Moreover, by synchronizing the value of the signal GST between plural processing systems 10a (e.g., by using an interface IF shown in FIG. 2 and the communication system 20 shown in FIG. 1) and by using the same time resolution for the ticks in the various processing systems 10a, the operation of these processing systems 10a may be synchronized.

As mentioned before, the signal GST is provided to a plurality of circuits 110 of the processing system 10a. Specifically, in various embodiments the signal GST may be provided in reduced resolution to the circuits 110.

Figure 4:
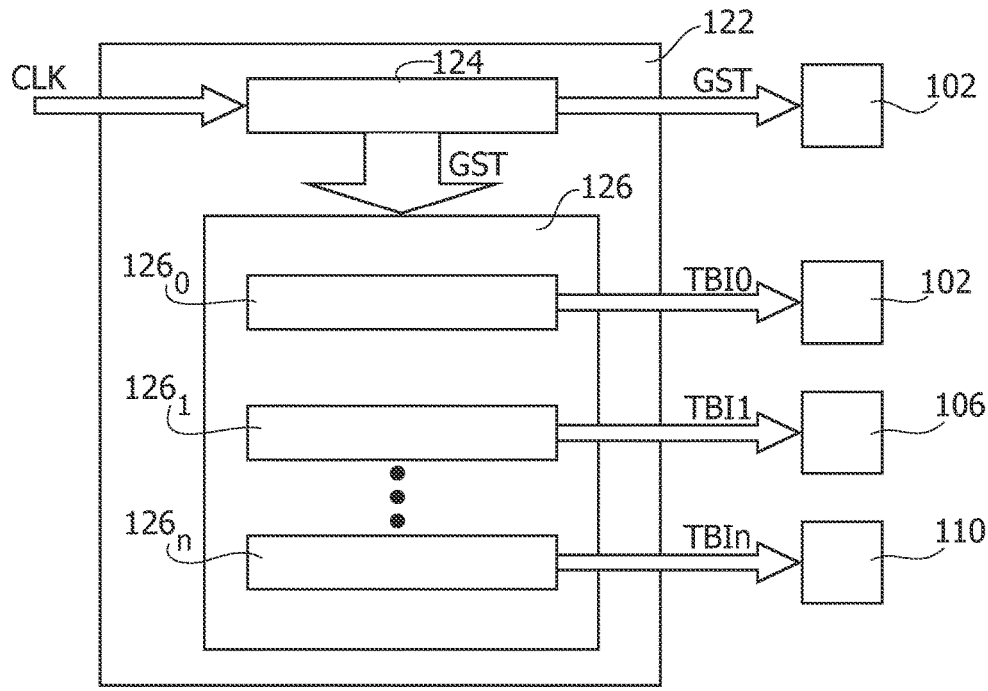
FIG. 4 shows an embodiment of the timer reference circuit of FIG. 3, wherein the timer reference circuit generates via a counter circuit a global reference time signal and via a time base distribution circuit a plurality of additional reference time signals.

For example, FIG. 4 shows an embodiment of such a time reference circuit 122.

Specifically, as described, in the foregoing the time reference circuit 122 is configured to increase a count value. For example, in FIG. 4 is schematically shown a counter circuit 124, configured to increase the signal GST in response to the clock signal CLK.

Figure 5:
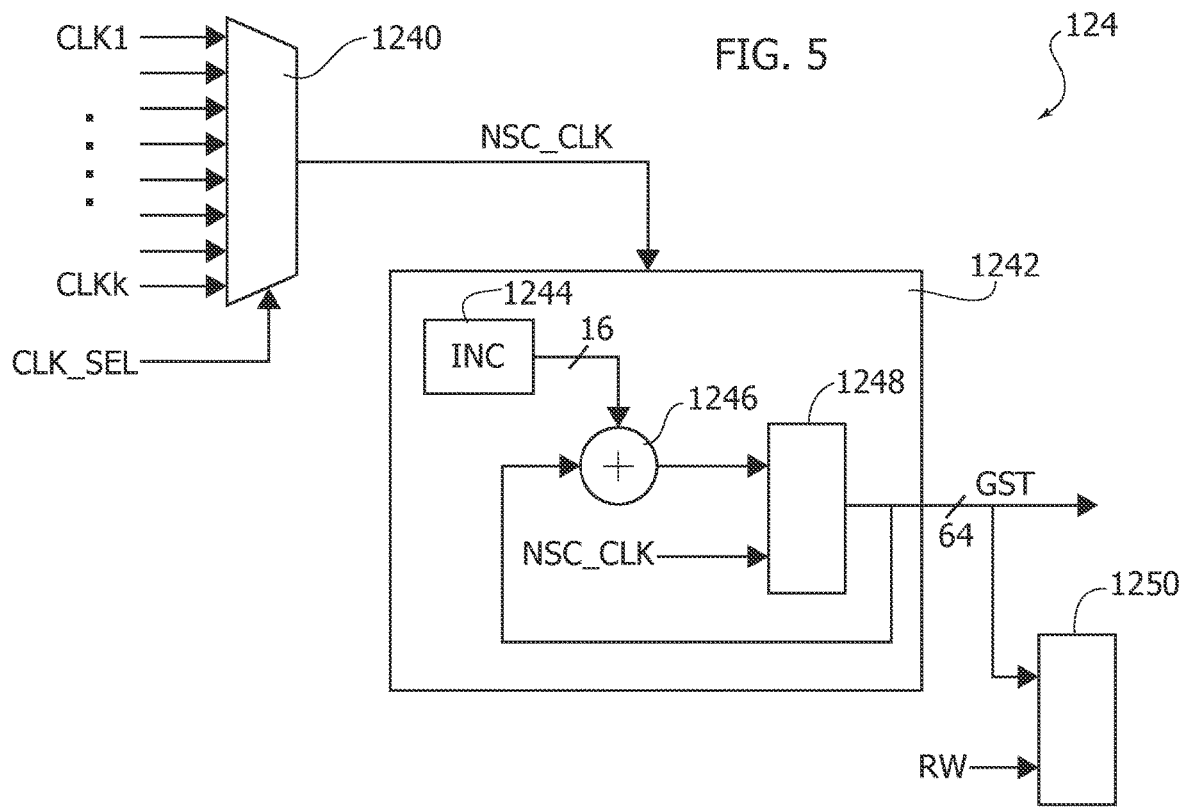
FIG. 5 shows an embodiment of the counter circuit of FIG. 4.

For example, FIG. 5 shows a possible embodiment of the counter circuit 124.

In the embodiment considered, the counter circuit 124 comprises a digital counter circuit 1242 configured to increase the value of the signal GST by a given amount INC in response to a clock signal NSC_CLK, e.g. at each rising or falling edge of the clock signal NSC_CLK the digital counter circuit 1242 increase the value of the count value (signal GST) by the value INC. For example, in the embodiment considered, the digital counter circuit 1242 comprises:
- a register 1248 configured to store the count value (signal GST); and
- a digital adder circuit 1246 configured to sum the count value (signal GST) provided by the register 1248 and the signal INC, wherein the result is again stored to the register 1248 in response to the clock signal NSC_CLK.

In various embodiments, the signal INC is programmable and may be stored for this purpose in a register 1244. In various embodiments, the content of the register 1244 is programmable, e.g. by means of the processing unit 102, e.g. via software instructions. For example, in various embodiments, the value of the signal INC is determined as a function of the frequency of the clock signal NSC_CLK in order to implement a nanosecond counter 124. For example, for this purpose, the signal GST may have 64 bits, and for usual clock signals (e.g., in a range between 10 MHz and 100 MHz), the signal INC may only have 16 bits.

In various embodiments, the content of the register 1248, i.e. the signal GST, may be readable by the processing unit 102, e.g. via software instructions. Moreover, also the content of the register 1248 may be writeable/programmable, e.g. by means of the processing unit 102, e.g. via software instructions. For example, in this way, the processing unit 102 may set an initial value of the register 1248/signal GST. In fact, after start-up the signal GST indicates essentially the time elapsed since the processing system 10a has been switched on. Conversely, by overwriting the content of the register 1248 may synchronize the signal GST with respect to a starting date/epoch and/or with other processing systems 10.

As mentioned before, in various embodiments, the register may store 64 bits. However, often the processing unit 102 may only support 32 bits read and write accesses. In this, case the processing unit 102 needs to execute two read or write accesses in order to read or write the content of the register 1248. However, in the meantime the content of the register 1248 may already change.

Accordingly, in various embodiments, the counter circuit 124 may comprise a further register or latch 1250 configured to store at least part of the content of the register 1248 when a read or write access to the signal GST is performed. For example, once the processing unit 102 requests a read access to the upper or lower 32 bits of the signal GST (as indicated schematically by a signal RW), the register or latch 1250 may store the content of all bits of the signal GST or only the respective lower or upper 32 bits of the signal GST currently not read. Next, when the processing unit 102 requests a read access to the remaining lower or upper 32 bits of the signal GST, the respective bits may be read from the register or latch 1250.

Generally, the clock signal NSC_CLK may correspond directly to the clock signal CLK shown in FIG. 4. Conversely, in the embodiment considered, the counter circuit 124 supports a plurality of clock signals CLK1 . . . CLKk.

In this case, the counter circuit 124 may comprise a multiplexer 1240 configured to select one of the clock signals CLK1 . . . CLKk as clock signal NSC_CLK as a function of a selection signal CLK_SEL. In various embodiments, also the signal CLK_SEL may be programmable (e.g., be stored the value of the signal CLK_SEL in a register), e.g. by means of the processing unit 102, e.g. via software instructions.

FIG. 4 shows also that the time reference circuit 122 may also comprise a time base distribution circuit 126. Specifically, the circuit 126 is configured to generate a plurality of time base signals TBI0 . . . TBIn, wherein each of the time base signals TBI0 . . . TBIn is provided to one or more respective circuits 110 of the processing system 10a.

In various embodiments, one or more of the circuits no may be selectable, e.g. by means of a suitable programming of the processing unit 102 or by means of configuration data of the processing system 10a which are read during the start-up of the processing system 10a.

For example, a time base signal TBI0 may be provided always to the processing unit 102 and/or one or more time base signals TBI1 . . . TBIn may be provided to respective resources 106 of the processing system 10a.

Figure 6A:
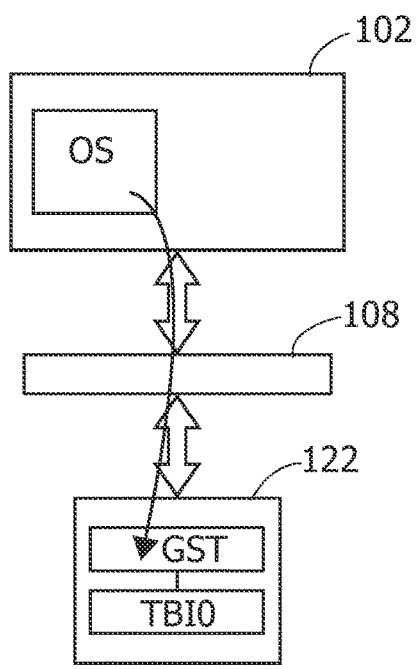
FIGS. 6A and 6B show embodiments how a processing unit of the processing system may obtain the global reference time signal or one of the additional reference time signals.
Figure 6B:
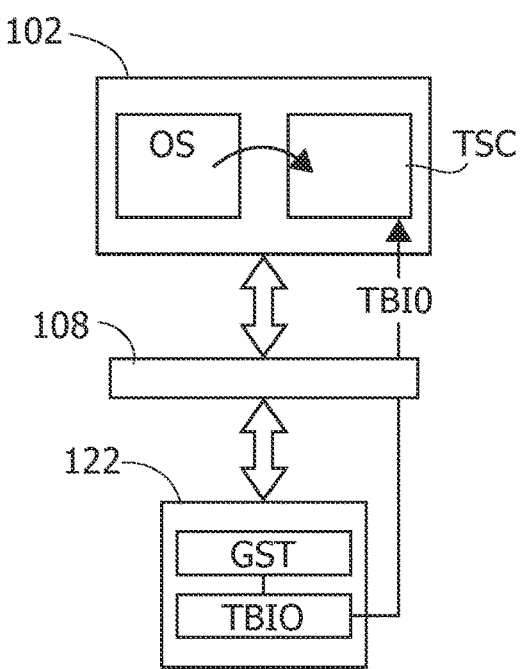

Accordingly, as schematically shown in FIGS. 6A and 6B, in various embodiments, the processing unit 102 may be interfaced with the time reference circuit 122 via two interfaces.

Specifically, as shown in FIG. 6A, the processing unit 102 may be connected to the time reference circuit 122 via a system bus 108, e.g. used to connect the resources 106 to the processing system 102. For example, such a system bus may include one or more Advanced Microcontroller Bus Architecture (AMBA) buses, such as an AMBA High-performance Bus (AHB). Accordingly, in various embodiments, a microprocessor 102 may read the content of the register 1248/signal GST via conventional software instructions, e.g. via an operating system OS of the processing unit 102, by using the address associated with the register 1248/signal GST.

Conversely, a lot of modern microprocessors also include an internal Time Stamp Counter (TSC), which is e.g., included in x86 processors since the Pentium. As shown in FIG. 6B, in this case, one of the time base signal, e.g. TBI0, may correspond to the signal of the Time Stamp Counter TSC.

Substantially, while in FIG. 6A the software instruct has to access a hardware resource of the processing system 10a, which has to be routed through the bus system 108, the access in FIG. 6B occurs to a (virtual) internal resource of the microprocessor 102.

As described in the foregoing, one or more time base signals, e.g. TBI1 . . . TBIn may be provided to respective (e.g. programmable) resources 106 of the processing system 10a. For example, this is schematically shown in FIG. 7, wherein:
- a time base signal TBI1 is provided to an analog-to-digital converter ADC of the processing system 10a; and/or
- a time base signal TBI2 is provided to first communication interface IF1 of the processing system 10a, such as a SPI interface; and/or
- a time base signal TBI3 is provided to second communication interface IF2 of the processing system 10a, such as a CAN bus interface.

Thus, in the embodiments considered, one or more of the resource 106 of the processing system 10a receive directly a time base signal (TBI0 . . . TBIn) indicative of the global system time GST.

Accordingly, these one or more resources 106 may directly store the value of the respective time base signal in response to given events, e.g. when generating a respective interrupt for the processing unit 102.

Figure 7:
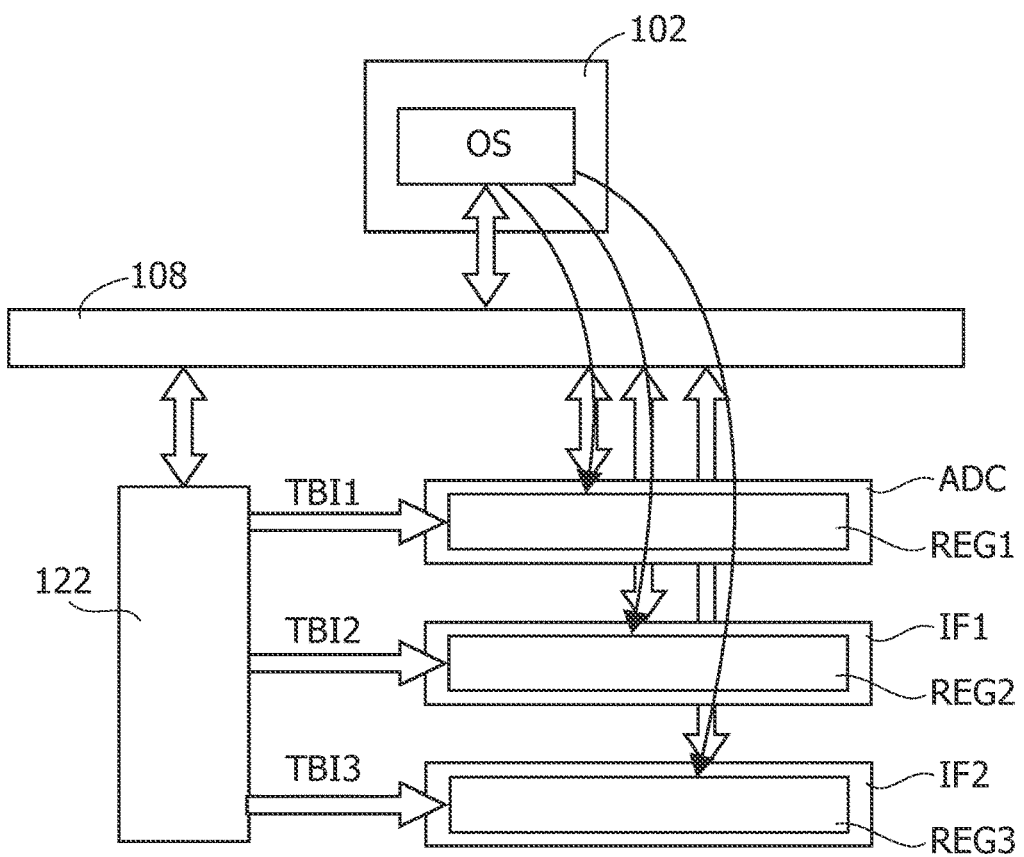
FIGS. 7 and 8 show embodiments of one or more circuits which use the additional reference time signals in order to store a time stamp directly at a hardware level in response to given events.

For example, this is schematically shown in FIG. 7, wherein each (or at least one) of the resources 106 receiving a time base signal may comprise a respective register for storing the value of the respective time base signal, e.g.:

the analog-to-digital converter ADC may comprise a register REG1 for storing the content of the time base signal TBI1;

the interface IF1 may comprise a register REG2 for storing the content of the time base signal TBI2; and the interface IF2 may comprise a register REG3 for storing the content of the time base signal TBI3.

In various embodiments, the processing system 10a is thus configured that the processing unit 102 may read the content of these registers (REG1, REG2, REG3). Accordingly, in this way, the time stamp is stored directly at a hardware level when the respective event is generated, thereby avoiding that the processing unit 102 has to obtain separately, e.g. via software instructions (see also FIGS. 6A and 6B), a respective time stamp.

Figure 8:
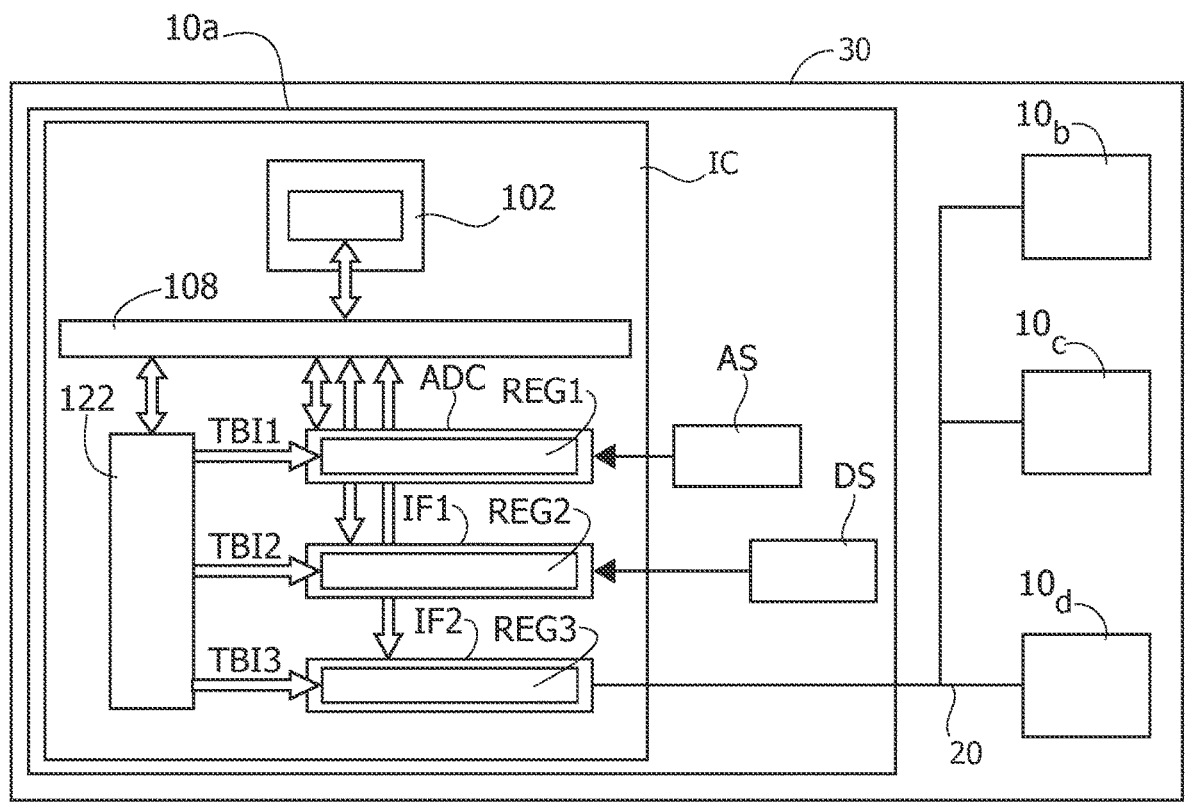

For example, FIG. 8 shows a possible embodiment of the electronic system of a vehicle 30. As described with respect to FIG. 1, in this case a plurality of processing systems 10a, 10b, 10c and 10d are connected to a communication system 20, such as a CAN bus.

For example, in this architecture the blocks of the processing system 10a of FIG. 7 may be integrated in an integrated circuit, wherein:

the analog-to-digital converter ADC is connected to an analog sensor AS; and/or the communication interface IF1 is connected to a digital sensor DS, and/or the communication interface IF2 is connected to the communications system 20.

For example, in such a processing system 10a, the analog-to-digital converter ADC may store the value of the respective time base signal TBI1 to the register REG1 when an analog-to-digital conversion has been completed. Optionally, the analog-to-digital converter ADC may generate (preferably simultaneously) an interrupt for the processing unit 102.

Similarly, the interface IF1 may store the value of the respective time base signal TBI2 to the register REG2 when a response has been received from the digital sensor DS. Optionally, the interface IF1 may generate (preferably simultaneously) an interrupt for the processing unit 102.

Finally, the interface IF2 may store the value of the respective time base signal TBI3 to the register REG3 when a data-packet has been received via the communication system 20, e.g. from another processing system 10 connected to the communication system 20. Optionally, the interface IF2 may generate (preferably simultaneously) an interrupt for the processing unit 102.

Accordingly, once the processing unit 102 determines a given event of one of the resources 106, e.g. via a respective interrupt or by periodically reading the content of a respective status register, the processing unit 102 may also read (e.g., in addition to the digital sample provided by the converter ADC, the data received by the interface IF1 and/or the data received by the interface IF2) the content of the respective register having stored the time base signal when the event occurred. For example, as shown in FIG. 7, in various embodiments, the resources 106, and in particular the registers REG1, REG2, REG3 may be connected for this purpose to the bus 108. Accordingly, in various embodiments, the processing unit 102 may read the content of the registers REG1, REG2, REG3 via software instructions.

Generally, the various circuits 110 (processing unit 102 and/or resources 106) may require different resolutions of the time signal GST. Accordingly, as shown in FIG. 4, each time base signal TBI0 . . . TBIn may have associated a respective time base interface circuit $126_0$ . . . $126_n$, configured to generate the respective time base signal TBI0 . . . TBIn as a function of the signal GST.

For example, in various embodiments, each of the time base signals TBI0 . . . TBIn is connected to a given resource 110 of the processing system 10a. Thus, knowing the time resolution supported by a given resource 110, each resource 110 may only receive a given number of bits of the time reference signal GST. Thus, the routing of the bits may be fixed at a hardware level within each time base interface circuit $126_0$ . . . $126_n$, e.g.:

the processing unit 102 may receive all 64 bits of the signal GST;

the converter ADC may receive 24 bits of the signal GST;

the interface IF1 may receive 16 bits of the signal GST; and the interface IF2 may receive 32 bits of the signal GST.

Figure 9:
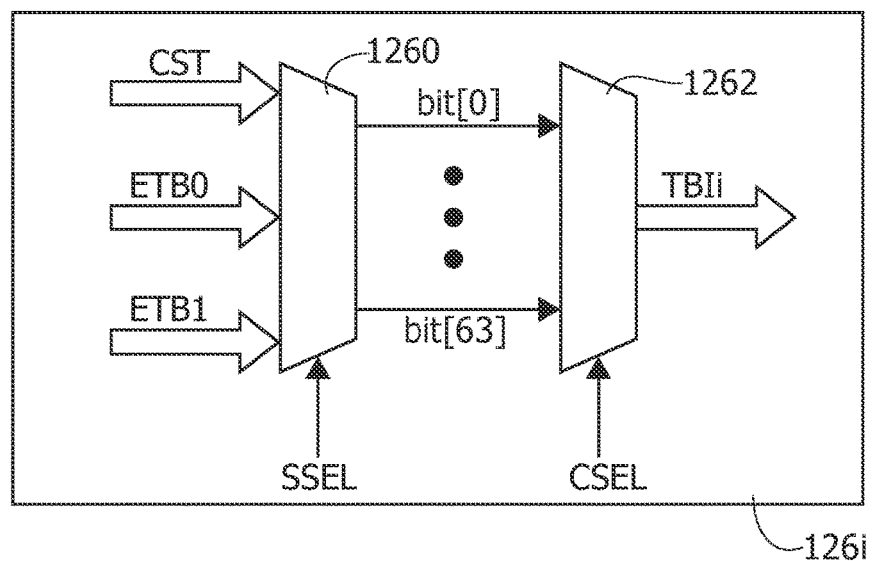
FIG. 9 shows an embodiment of the time base distribution circuit of FIG. 4.

Conversely, FIG. 9 shows an embodiment of a programmable time base interface circuit 126i, which may be used for at least one of the time base interface circuit $126_0$ . . . $126_n$.

Specifically, in the embodiment considered, the time base interface circuit 126i receives at input the signal GST having a given number of bits N1 (e.g. 64 bits) and provides at output a respective time base signal TBIi, wherein the time base signal TBIi has the number of bits N2 (e.g. 64, 32, 24 or 16 bits) supported by the respective resource no connected to the time base signal TBIi.

In the embodiment considered, the time base interface circuit 126i comprises moreover a selection circuit 1262, such as a multiplexer, configured to select for the signal TBIi N2 bits of the signal GST as a function of a selection signal CSEL. In various embodiments, the signal CSEL may be programmable (e.g. be stored the value of the signal CSEL in a register), e.g. by means of the processing unit 102, e.g. via software instructions.

For example, in various embodiments, the signal CSEL may have two bits and the selection circuit 1262 may be configured to use the following mapping for the signal TBIi:

| $N_2$ | CSEL | Selected bits of GST |
|---|---|---|
| 16 | "00" | [9..24] |
|  | "01" | [13..28] |
| 24 | "00" | [3..26] |
|  | "01" | [6..29] |
|  | "10" | [9..32] |
| 32 | "00" | [3..34] |
|  | "01" | [6..37] |
|  | "10" | [9..40] |
| 64 | — | [0..63] |

In various embodiments, the time base interface circuit 126i may also support one or more further reference time signals ETB0 and ETB1. For example, in FIG. 9 is shown a further multiplexer 1260 with selects as current reference time signal of the time base interface circuit 126i one of the signals GST, ETB0 or ETB1 as a function of a selection signal SSEL, i.e. the selection circuit 1262 receives at input the current reference time signal selected by the multiplexer 1260. In various embodiments, the signal SSEL may be programmable (e.g., be stored the value of the signal SSEL in a register), e.g. by means of the processing unit 102, e.g. via software instructions.

Generally, in case the further reference time signal has a number of bits being smaller than the number of bits (N1) of the signal GST the missing (e.g., most significant) bits may be set to "0".

For example, resources 106 of a processing system 10a which often use an external time stamp bus may be a CAN FD (CAN with Flexible Data-Rate) interface, a sigma-delta analog-to-digital converter, a complex ADC, etc.

Generally, insofar as the further reference time signal may have a different tick time than the signal GST, also the selection implemented within the selection circuit 1262 (as a function of the selection signal CSEL) may change based on whether the reference time signal GST or a further reference time signal (ETB0, ETB1) has been selected.

In various embodiments, the time reference circuit 122 may also implement further functions.

Figure 10:
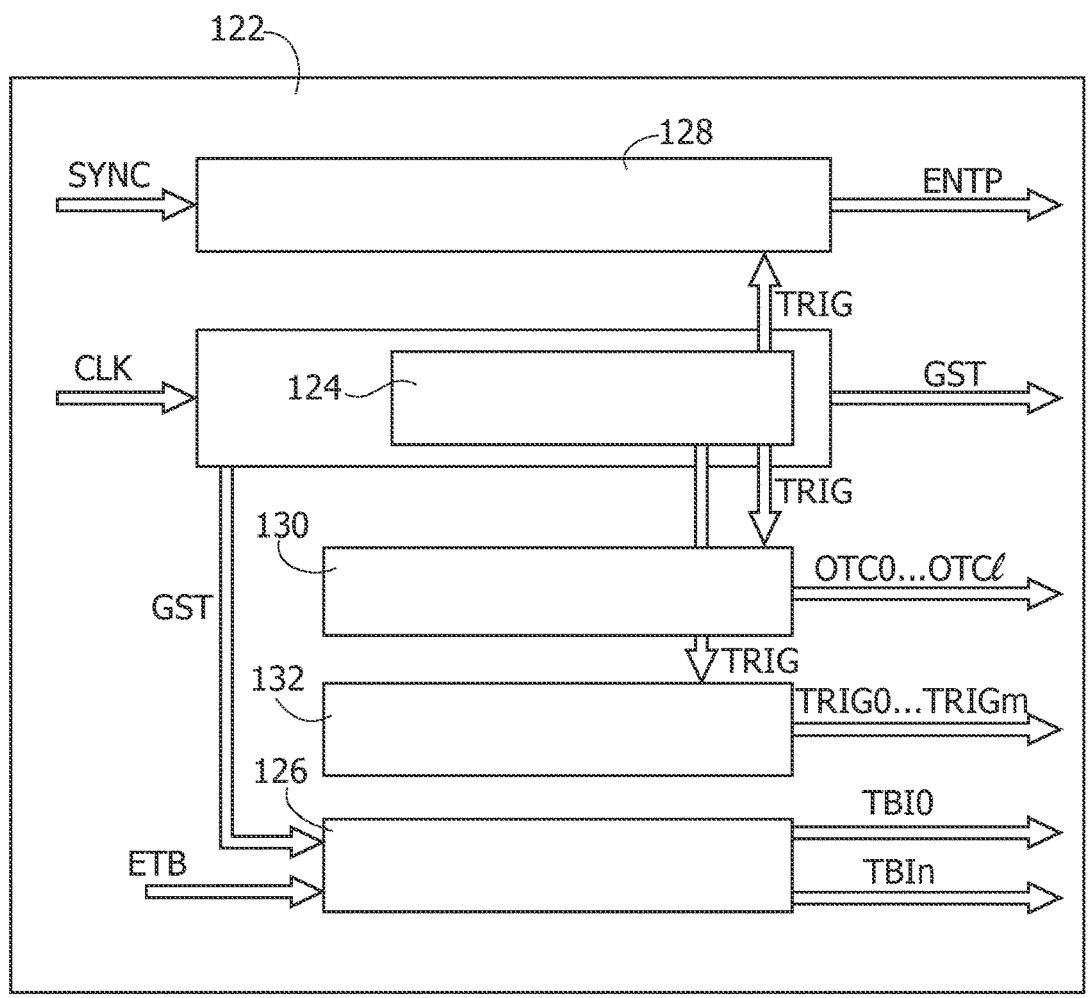
FIG. 10 shows a further embodiment of the timer reference circuit of FIG. 3 comprising also an extended timer circuit, an operation time counter circuit and a trigger generator circuit.

For example, FIG. 10 shows an embodiment, wherein the time reference circuit 122 may comprise (in addition to the counter circuit 124 and the time base circuit 126) one or more of the following optional circuits:
an extended timer circuit 128; and/or
an operation time counter circuit 130; and/or
a trigger generator circuit 132.

Generally, these circuits 128, 130 and 132 have in common that they do not receive directly the reference time signal GST, but they are driven via a trigger signal TRIG generated, e.g., by the counter circuit 124.

Specifically, in various embodiments, the trigger signal TRIG corresponds to the clock signal CLK used by the counter circuit 124, e.g. the signal NSC_CLK shown in FIG. 5.

Figure 11:
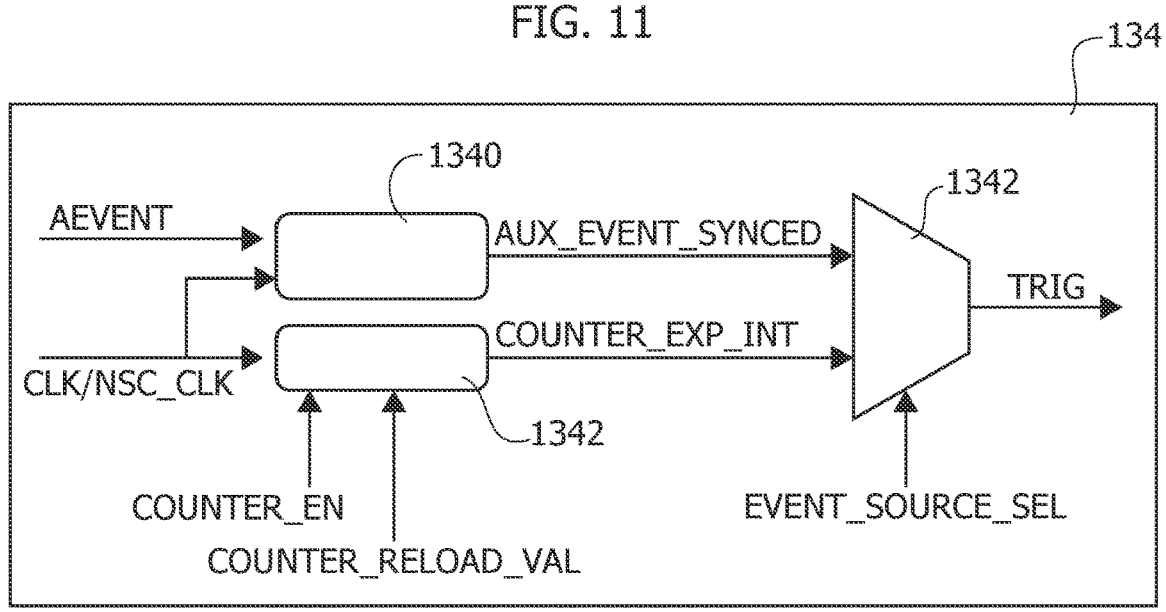
FIG. 11 shows an embodiment of a trigger generator circuit generating a trigger signal adapted to activate the extended timer circuit, operation time counter circuit and trigger generator circuit of FIG. 10.

Conversely, FIG. 11 shows an embodiment of a trigger generator circuit 134, which may be included in the counter circuit 124.

Specifically, in the embodiment considered, the trigger generator circuit 134 implements a pre-scaler for the clock signal CLK/NSC_CLK used by the counter circuit 124. For example, in the embodiment considered, the trigger generator circuit 134 comprises for this purpose a digital counter 1342 which generates a signal COUNTER_EXP_INT when the counter reaches a given reference value.

For example, in various embodiments, the counter 1342 is a down-counter which generates the signal COUNTER_EXP_INT when the count value of the counter 1342 reaches 0. In this case, the counter 1342 may be configured to set the count value again to a reload value COUNTER_RELOAD_VAL. In various embodiments, the signal COUNTER_RELOAD_VAL may be programmable (e.g., be stored the value of the signal COUNTER_RELOAD_VAL in a register), e.g. by means of the processing unit 102, e.g. via software instructions.

In various embodiments, the trigger generator circuit 134 may be selectively enabled. For example, in the embodiment considered, the trigger generator circuit 134 may be enabled by enabling the counter 1342 via an enable signal COUNTER_EN. In various embodiments, the signal COUNTER_EN may be programmable (e.g., be stored the value of the signal COUNTER_EN in a register), e.g. by means of the processing unit 102, e.g. via software instructions.

Thus, the trigger signal TRIG may correspond to the signal COUNTER_EXP_INT which essentially is set each time the clock signal has reached a given number of COUNTER_RELOAD_VAL cycles.

In various embodiments, the trigger generator circuit 134 is also configured to synchronize at a circuit 1340 the clock signal CLK/NSC_CLK used by the counter circuit 124 with an auxiliary signal AEVENT indicative of a given event, thereby generating a signal AUX_EVENT_SYNCED being set when the clock signal CLK/NSC_CLK is set and the auxiliary signal AEVENT is set.

In the embodiment considered, the trigger generator circuit 134 may thus comprise a multiplexer configured to select for the trigger signal TRIG either the signal AUX_EVENT_SYNCED or the signal COUNTER_EXP_INT as a function of a selection signal EVENT_SOURCE_SEL. In various embodiments, the signal EVENT_SOURCE_SEL may be programmable (e.g. be stored the value of the signal EVENT_SOURCE_SEL in a register), e.g. by means of the processing unit 102, e.g. via software instructions.

Thus, in the embodiment considered, the circuit 124 implements a Base Time Unit (BTU), which essentially comprises a counter 1242, such as a 64-bit nanosecond counter (NSC). Preferably, the time tick granularity of this counter is programmable via the signal INC and should be set based on clock signal NSC_CLK used, such that a single tick period equals to one nanosecond. For example, assuming a clock source frequency of 10 MHz, the increment step INC should be $(10^9/10^5)=100$ or 0×64. Conversely, the trigger/event generator 134 is configured to generate periodic pulse based on a programmable (e.g., timeout) counter 1342 which runs with the clock signal NSC_CLK.

As mentioned before, the trigger signal TRIG may be used by the optional circuits 128, 130 and 132.

Figure 12:
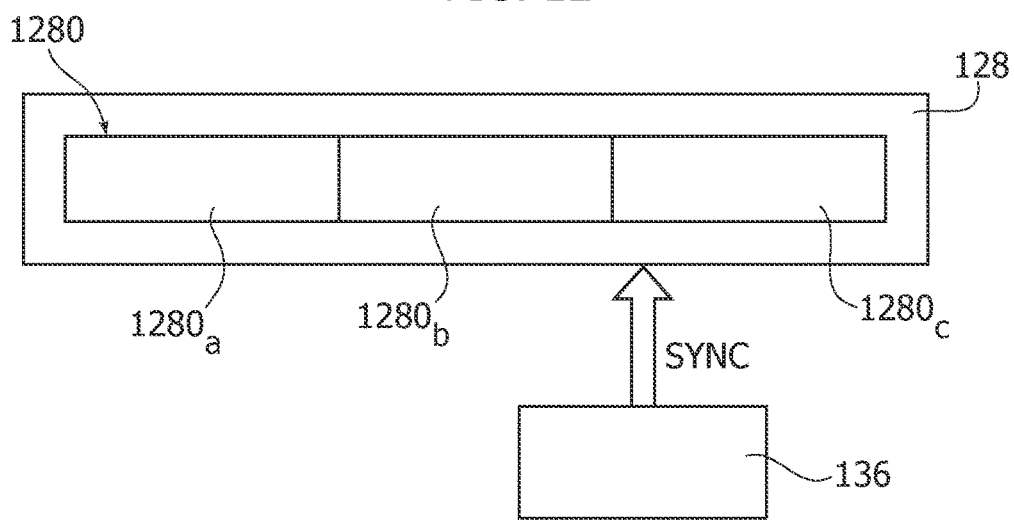
FIG. 12 shows an embodiment of the extended timer circuit of FIG. 10.

For example, FIG. 12 shows an embodiment of an extended timer circuit 128.

Specifically, in the embodiment considered, the extended timer circuit 128 is implemented with a counter circuit 128 configured to generate a time signal ENTP having 80 bits, wherein the bit sequence of the lower 64 bits follows the Network Time Protocol (NTP) format, which is, e.g., described at https://en.wikipedia.org/wiki/Network_Time_Protocol#Timestamps.

Specifically, also such a NTP format uses essentially a fist bit-sequence 1280b of 32 bits indicative of the seconds lapsed since the era epoch of 1 Jan. 1900. Conversely, a second bit-sequence 1280c of 32 bits is indicative of the fraction of seconds. Accordingly, the 32-bit (seconds) counter 1280b would overflow in year 2036. To overcome this potential overflow the updated NTPv4 format uses 64-bit for second and 64-bit for fraction of second. But this extended range is essentially useless for typical processing systems 10a, and accordingly only an additional 16-bit overflow counter 1280a is added in the embodiment considered, thereby using essentially a 48-bit second counter (IEEE 1588-2008 implementation).

In various embodiments, the resolution for the "fraction of seconds" stored is 1 nanosecond. Accordingly, in this case, the counter 1280c should perform a rollover when the respective count value reaches 0x3B9A_C9FF.

In various embodiments, the extended timer circuit 128 may be driven either via the trigger signal TRIG or directly via the clock signal CLK/NSC_CLK used by the counter circuit 124.

Accordingly, in various embodiments, also the increment step size ExNTP_INC-STEP for the extended timer circuit 128, in particular the counter 1280c, may be programmable, e.g. by means of the processing unit 102, e.g. via software instructions. For example, when the extended timer circuit 128 uses the clock signal CLK/NSC_CLK having a frequency of 100 MHz, the step ExNTP_INC-STEP should be set to 10. Conversely, when the extended timer circuit 128 uses the trigger signal TRIG with a pre-scale value COUNTER_RELOAD_VAL of 4 for the same clock signal CLK/NSC_CLK (100 MHz), the step size ExNTP_INC-STEP should be 40.

In various embodiments, the value of the extended timer circuit 128 may be readable and optionally also writable by means of the processing unit 102, e.g. via software instructions. In case the processing unit 102 has less bits, e.g. only 32, the processing unit 102 may perform plural consecutive accesses to the values of the counter 1280$a$, 1280$b$ and 1280$c$. Thus, also in this case may be used a register or latch to store the remaining bits as described with respect to FIG. 5 for the counter circuit 124.

Moreover, in various embodiments, the extended timer circuit 128 may also support a synchronization operation via a synchronization signal SYNC provided by another NTP timer circuit 136, such as the NTP timer of an (external or internal) Ethernet MAC (IEEE 1588-2008) complaint module.

Figure 13:
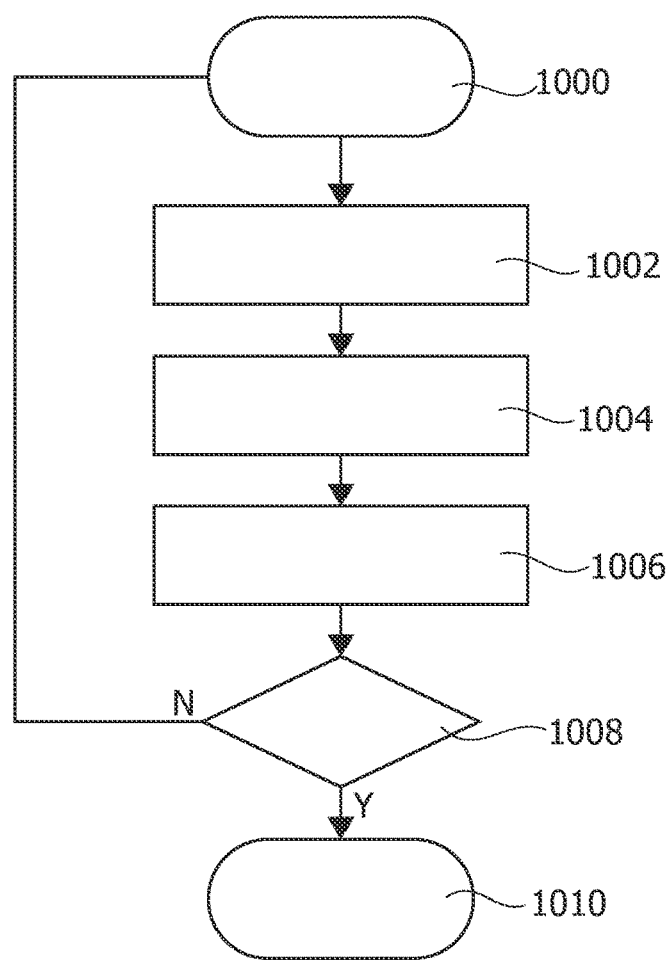
FIG. 13 shows an embodiment of the operation of the extended timer circuit of FIG. 12.

For example, a possible procedure for synchronizing the extended timer circuit 128 is shown in FIG. 13.

After a start step 1000, the processing unit 102 obtains (e.g., from the module 136) and stores at a step 1002 the 16 (MSB) bits to the counter 1280$a$.

At a next step 1004, the processing unit 102 activates the synchronization mode of the extended timer circuit 128, e.g. by sending a suitable command to the extended timer circuit 128. Accordingly, the extended timer circuit 128 will store the signal SYNC to the lower 64 bits, i.e. will overwrite the content of the count values 1280$b$ and 1280$c$.

In various embodiments, the processing unit 102 may then obtain at a step 1006 again the 16 MSB from the module 136 and verify at a step 1008 whether the corresponding bits provided by the module 136 changed, e.g. performed an overflow.

In case the bits changed (output "N" of the verification step 1008), the processing unit 102 may return to the step 1002 for performing a new synchronization operation.

Conversely, in case the bits did not change (output "Y" of the verification step 1008), the procedure ends at a stop step 1010.

Figure 14:
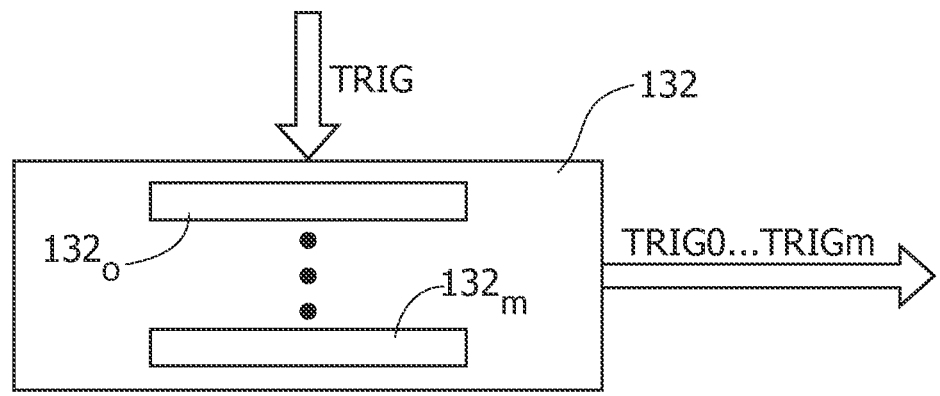
FIGS. 14, 15, 16 and 17 shows an embodiment of the trigger generator circuit of FIG. 10.

As mentioned before, the time reference circuit 122 may also comprise an optional trigger generator circuit 132. For example, FIG. 14 shows a possible implementation of the trigger generator circuit 132.

Specifically, in the embodiment considered, the trigger generator circuit 132 receives at input the trigger signal TRIG and generates one or more trigger signals TRIG0 . . . TRIGm.

For example, in the embodiment considered, the trigger generator circuit 132 comprises at least one trigger generator sub-circuit 132$_0$ . . . 132$_m$, wherein each trigger generator sub-circuit is configured to generate one or more respective trigger signals TRIG0 . . . TRIGm.

Figure 15:
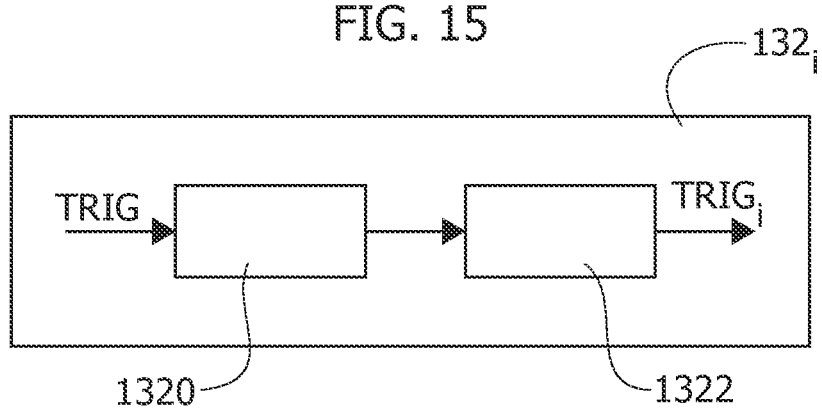

For example, FIG. 15 shows a possible embodiment of a generic trigger generator sub-circuit 132$i$.

In the embodiment considered, the trigger generator sub-circuit 132$i$ essentially comprises a digital counter 1322 configured to increase a respective count value in response to the trigger signal TRIG and the trigger generator sub-circuit 132$i$ is configured to set one or more respective trigger signals TRIGi as a function of the count value of the counter 1322.

In various embodiments, the counter 1322 does not receive directly the trigger signal TRIG, but the signal TRIG is provided to a further programmable pre-scale circuit 1320 and the counter 1322 is increased in response to the pre-scaled trigger signal TRIG. The respective description of the pre-scale circuit 1342 (see FIG. 11) applies also to the pre-scale circuit 1320.

Accordingly, in various embodiments, each trigger generator sub-circuit 132$i$ may comprise a respective pre-scale circuit 1320 and counter 1322.

As mentioned before the one or more trigger signals TRIGi of a given trigger generator sub-circuit 132$i$ are generated as a function of the count value of the respective counter 1322.

Figure 16:
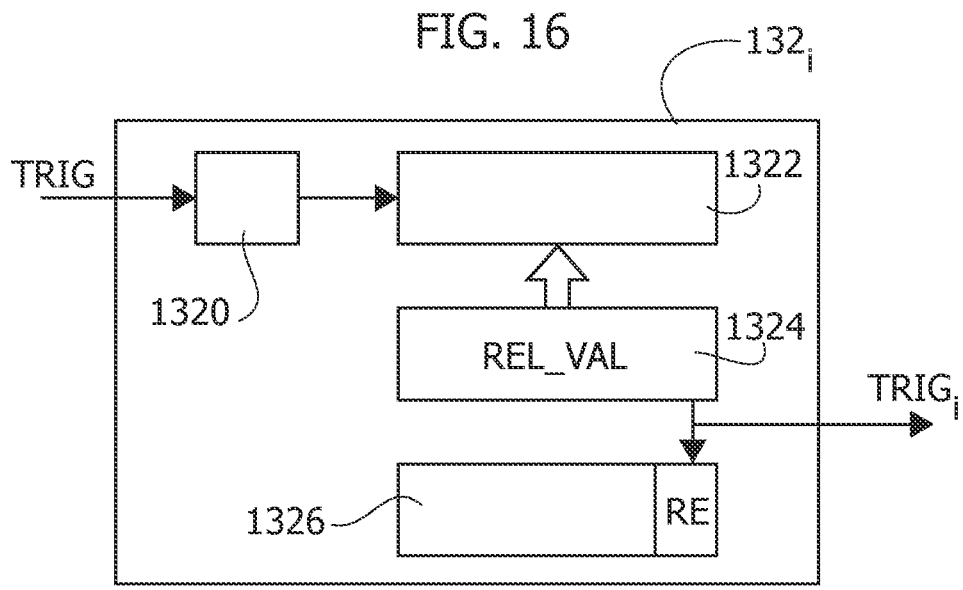
Figure 17:
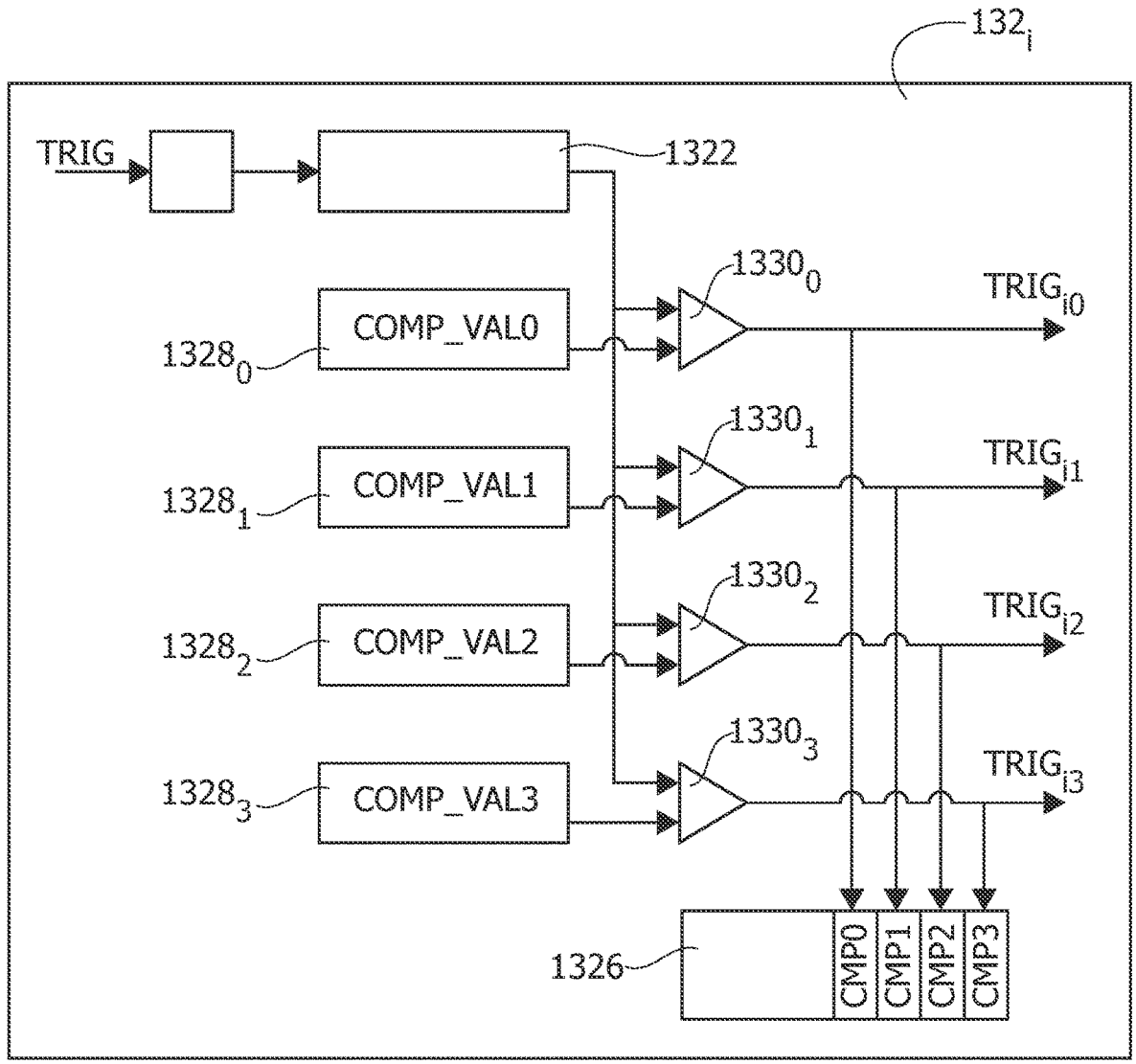

FIGS. 16 and 17 show in this respect two embodiment which may be implemented alternatively or also in combination (e.g. by using a respective mode selection signal).

Specifically, FIG. 16 shows an embodiment, wherein the trigger generator sub-circuit 132$i$ is operated as a timeout counter configured to generate a signal RE when the counter 1322 has counted for a given number of cycles.

For example, in the embodiment considered, the counter 1322 is operated as a up or down counter and when the counter 1322 reaches a given value (e.g. 0x0000 0000 or 0xFFFF FFFF for a 32 bit counter), the counter 1322 loads a given reload value REL_VAL and generates a reload signal RE. In various embodiments, the signal REL_VAL may be programmable (e.g., be stored the value of the signal REL_VAL in a register 1324), e.g. by means of the processing unit 102, e.g. via software instructions. Similarly, also the count direction (up or down) of the counter 1322 may be programmable.

Accordingly, in the embodiment considered, the trigger signal TRIGi may correspond to the reload signal RE. In the embodiment considered, the reload signal RE is also stored to a status register 1326 of the trigger generator sub-circuit 132$i$.

Conversely, FIG. 17 shows an embodiment, wherein the trigger generator sub-circuit 132$i$ is operated as a compare module.

Specifically, in the embodiment considered, the counter 1322 is again reset to a given start value (typically 0) and the counter 1322 is activated, thereby varying the respective count value. For example, in various embodiments, the counter 1322 may be reset and started via the processing unit 102, e.g. via software instructions. In various embodiments, the count direction (up or down) of the counter 1322 may be programmable.

In the embodiment the count value of the counter 1322 is provided to one or more comparators 1330. For example in FIG. 17 are shown four comparators 1330$_0$ . . . 1330$_3$. Each of the comparators 1330$_0$ . . . 1330$_3$ is configured to compare the count value of the counter 1322 with a respective comparison value COMP_VAL0 . . . COMP_VAL3. In various embodiments, the comparison values COMP_VAL0 . . . COMP_VAL3 may be programmable (e.g., be stored the comparison values COMP_VAL0 . . . COMP_VAL3 in respective registers 1328$_0$ . . . 1328$_3$), e.g. by means of the processing unit 102, e.g. via software instructions.

Accordingly, in the embodiment considered, each of the comparators 1330$_0$ . . . 1330$_3$ may generate a respective trigger signal TRIGi0 . . . TRIGi3 when the count value of the counter 1322 corresponds to the respective comparison value COMP_VAL0 . . . COMP_VAL3. In the embodiment considered, the values of the trigger signals TRIGi0 . . . TRIGi3 are also stored to respective bits CMP0 . . . CMP3 of a status register 1326 of the trigger generator sub-circuit 132$i$.

Generally, the trigger signals provided by the trigger generator sub-circuit $132i$ may thus be used in various modes, such as:
- a mere flags which are stored to a status register $1326$ of the trigger generator sub-circuit $132i$;
- generate an interrupt for the processing unit $102$;
- generate trigger signals/interrupts for other resources $106$ of the processing system $10a$, such as starting an A/D conversion, obtaining sensor data from a digital sensor, etc.

In various embodiments, each of the trigger generator sub-circuit $132i$ may also be associated with a given circuit $110$ (processing unit $102$ or resource $106$) of the processing system $10a$.

In various embodiments, the use of the trigger signal, such as simple storage to the status register $1326$ or also the generation of an interrupt for the processing unit $102$ may be programmable.

As mentioned before, in various embodiments, the time reference circuit $122$ may also comprise an operation time counter circuit $130$. For example, FIG. $18$ shows an embodiment of the operation time counter circuit $130$.

In the embodiment considered, the operation time counter circuit $130$ comprises at least one counter $1302_0 \ldots 1302_1$, wherein each counter $1302_0 \ldots 1302_1$ is configured to generate a respective count value $OTC_0 \ldots OTC_1$, which may be read (and possibly also written) via the processing unit $102$, e.g. via software instructions. Moreover, in various embodiments, each of the counter $1302_0 \ldots 1302_1$ may be reset and/or started and/or stopped by the processing unit $102$, e.g. via software instructions.

Generally, each of the counters $1302_0 \ldots 1302_1$ may have essentially the architecture of the counter $1242$ shown in FIG. $5$ (possibly also comprising the register or latch $1250$ for improving the read access to the count value). In fact, also in this case, each of the counters $1302_0 \ldots 1302_1$ is configured to increase the respective count value by a given increase rate, which is programmable via the processing unit $102$, e.g. via software instructions.

Accordingly, with respect to the counter circuit $124$ shown in FIG. $5$, each of the counters $1302_0 \ldots 1302_1$ operates in response to the trigger signal TRIG and not directly the clock signal NSC_CLK. However, as also described with respect to the to the extended time circuit $128$, in various embodiments also the clock source for the counter $1302_0 \ldots 1302_1$ may be chosen between the clock signal NSC_CLK or the trigger signal TRIG. Thus, by setting/programming the increase rate in an appropriate manner, also the counters $1302_0 \ldots 1302_1$ may be used as nanoseconds counters (similar to the extended time circuit $128$).

For example, the counters $1302_0 \ldots 1302_1$ may be used to monitor the operating time of given application executed by the processing unit $102$.

In various embodiments, the counters $1302_0 \ldots 1302_1$ are configured to preserve the respective count values and configuration also over functional reset. For example, this is schematically shown in FIG. $19$.

Specifically, in response to a power-on reset or destructive reset at a step $2000$, the processing unit $102$ may configure at a step $2004$ one (or more) of the counter(s) $1302_0 \ldots 1302_1$. For example, the processing unit $102$ may read a given initial count value from a non-volatile memory $104$ of the processing system $10a$ and write the initial count value to the selected counter $1302_0 \ldots 1302_1$.

Accordingly, the selected counter $1302_0 \ldots 1302_1$ will wait at a step $2006$ for a new count event (as indicated by the trigger signal TRIG or the clock signal NSC_CLK). Specifically, in the absence of a count event (output "N" of the step $2006$), the counter returns to the step $2006$. Conversely, when a count event is signaled (output "Y" of the step $2006$), the counter increases at a step $2008$ the count value.

As schematically shown in FIG. $19$, in various embodiments, the processing unit $102$ may periodically store the count value of the selected counter $1302_0 \ldots 1302_1$. For example, for this purpose the processing unit $102$ may verify at a step $2010$ whether a given store interval has lapsed. In case the store interval has not elapsed (output "N" of the step $2010$), the procedure returns to the step $2006$. Conversely, in case store interval has elapsed (output "Y" of the step $2010$), the processing unit $102$ may overwrite at a step $2012$ the initial count value in the non-volatile memory $104$ of the processing unit $10a$ with the current count value of the selected counter $1302_0 \ldots 1302_1$, and the procedure returns to the step $2012$.

Accordingly, by storing the count value to a non-volatile memory $104$ and reprogramming the count value to the selected counter $1302_0 \ldots 1302_1$, the count value may be conserved also after a power-on/destructive reset.

Conversely, when a function reset occurs at a step $2002$, the counters $1302_0 \ldots 1302_1$ may already preserve the respective count values and configuration. Accordingly, in this case the step $2004$ may be omitted, i.e. the procedure may directly proceed to the step $2006$.

In various embodiments, one or more of the time reference signals (global system time GST and/or the time reference signals TBI0 . . . TBIn) may be transmitted in encoded format.

For example, this is schematically shown in FIG. $20$ for the time reference signals TBI0 . . . TBIn. Specifically, as described with respect to FIG. $4$, each of the time base interface circuit $126_0 \ldots 126_n$ is configured to generate a respective time reference signals TBI0 . . . TBIn, which is provided to a respective circuit $110_0 \ldots 110_n$ (processing unit $102$ or resource $106$).

In the embodiment considered, the reference signals TBI0 . . . TBIn are not transmitted directly to the respective circuit no, but each time base interface circuit $126_0 \ldots 126_n$ provides the respective time reference signal TBI0 . . . TBIn to an encoder circuit $138_0 \ldots 138_n$, thereby generating respective encoded time reference signals. Next, each encoder circuit $138_0 \ldots 138_n$ transmits the respective encoded time reference signal via a respective communication channel $142_0 \ldots 142_n$ to a respective decoder circuit $140_0 \ldots 140_0$. Finally, the decoder circuits $140_0 \ldots 140_n$ decode the respective received encoded time reference signal and provided the decoded time reference signal to the respective circuit $110_0 \ldots 110_n$.

For example, the encoder and decoder circuit $138_0 \ldots 138_n$ and $140_0 \ldots 140_n$ may be:
- Gray code encoders and decoders;
- error detection and possibly correction encoders and decoders.

Figure 18:
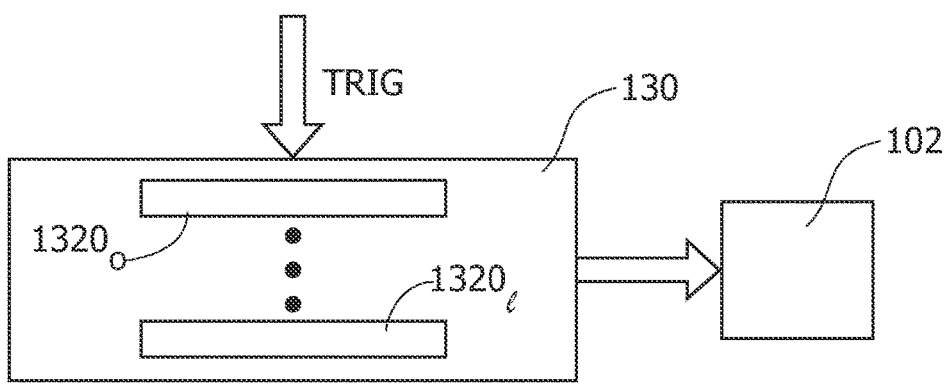
FIG. 18 shows an embodiment of the operation time counter circuit of FIG. 10.
Figure 19:
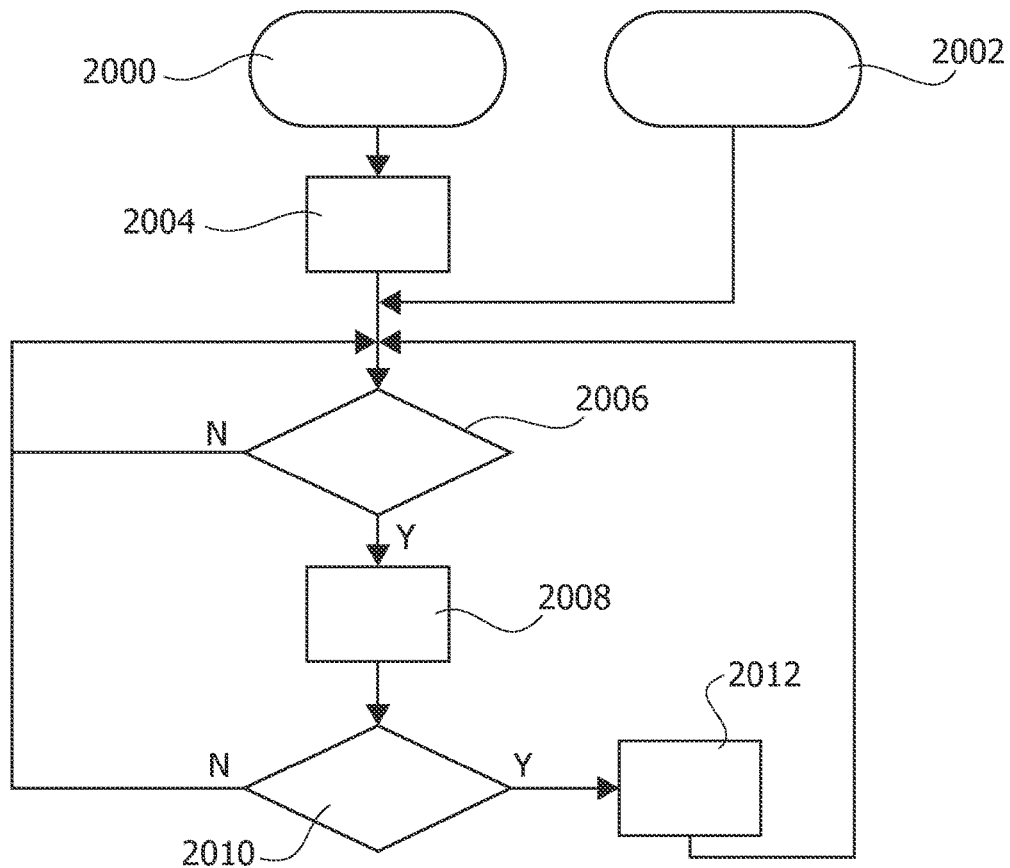
FIG. 19 shows an embodiment of the operation of the operation time counter circuit of FIG. 18.
Figure 20:
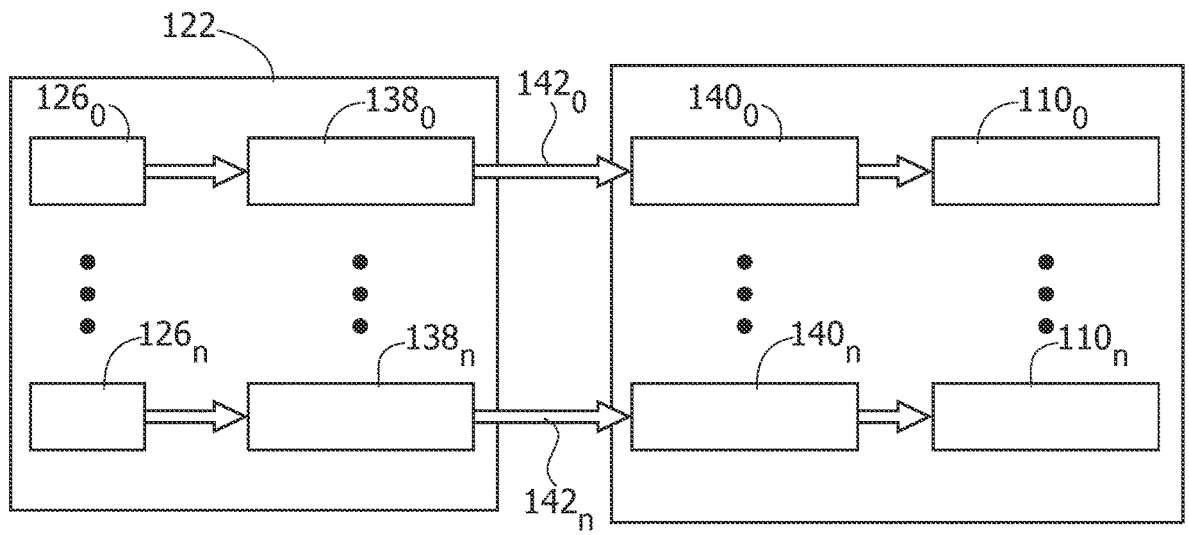
FIG. 20 shows an embodiment of the transmission of the additional reference time signals of FIG. 4 to one or more circuits of the processing system.

Accordingly, the various solutions described in the foregoing may have one or more of the following features:
- the counter circuit $124$ may be used to implement a nanosecond counter (see e.g., FIG. $5$);
- a plurality of additional reference time signals TBI0 . . . TBIn may be generated by the circuit $126$, which may be used by one or more resources $106$ of the processing system $10a$ in order to directly store at a hardware level a value indicative of the count value of the counter circuit $124$ when given events are detected in the respective resource $106$ (see e.g., FIGS. $6B$ and $7$);

the additional reference time signals TBI0 ... TBIn may have a programmable width and/or resolution (see e.g., FIG. 9);

the additional reference time signals TBI0 ... TBIn may operate with different clock signal (see e.g., FIG. 11);

an extended NTP timer 128 may be used which provides the seconds (and fractions of seconds) passed since Jan. 1, 1900 (see e.g., FIG. 12);

one or more (operational) time counters $1302_0 \ldots 1302_1$ may record the execution or lifetime of applications executed by the processing unit 102 (see e.g., FIGS. 18 and 19);

the trigger generator circuits $132_0 \ldots 132_m$ may be used to generate periodic interrupts for the processing unit 102 or the resources 106 (see e.g., FIG. 16);

the trigger generator circuits $132_0 \ldots 132_m$ may be used to generate interrupts when the counter value reaches given comparison values (see e.g., FIG. 17).

Accordingly, the solutions disclosed herein uses a high resolution (64-bit) global system time GST, which is provided at a hardware level to the processing unit 102 and/or (in reduced resolution) to one or more resources 106 of the processing system 10a, which thus may store a time stamp in response to given events. This feature enables (e.g., the operating system of) the processing unit 102 to obtain accurate hardware based time stamps instead of coarse software based time stamps. In fact, the captured hardware based time stamp values have a very short and constant delay versus the event which have triggered the time stamp capturing. The time at which the processing unit 102 is processing the hardware time stamp values has thus no influence any more on the accuracy of the time stamp information.

Of course, without prejudice to the principle of the invention, the details of construction and the embodiments may vary widely with respect to what has been described and illustrated herein purely by way of example, without thereby departing from the scope of the present invention, as defined by the ensuing claims.

What is claimed is:

1. A processing system comprising:
   a digital processing unit programmable as a function of a firmware stored to a non-volatile memory;
   a resource connected to the digital processing unit via a communication system; and
   a time reference circuit comprising a first digital counter circuit configured to generate, in response to a clock signal, a system time signal comprising a plurality of bits indicative of a time tick-count;
   a time base distribution circuit configured to generate a time base signal by selecting a subset of the bits of the system time signal, wherein the time base signal is provided to the resource; and
   an extended timer circuit comprising a second digital counter circuit comprising first, second, and third count values configured to generate, in response to the clock signal or a trigger signal generated as a function of the clock signal, an extended system time signal comprising a number of bits being greater than the number of bits of the system time signal, wherein the extended system time signal is readable by the digital processing unit.

2. The processing system according to claim 1, wherein the processing system is configured for synchronizing the extended timer circuit.

3. The processing system according to claim 2, wherein the processing system synchronizes the extended timer circuit by sending a synchronization command to the extended timer circuit.

4. The processing according to claim 3, wherein the extended timer circuit overwrites a content of the second and third count values upon receipt of the synchronization command.

5. The processing system according to claim 1, wherein the resource is configured to:
   detect a given event,
   store the time base signal to a register in response to the event, and
   signal the event to the digital processing unit, and
   wherein the digital processing unit is adapted to, in response to the event having been signaled by the resource, read via the communication system the time base signal from the register.

6. The processing system according to claim 1, wherein the resource comprises one of:
   a communication interface;
   an analog-to-digital converter or a digital-to-analog converter;
   a digital component;
   an analog component; and
   an analog/digital mixed signal component.

7. The processing system according to claim 6, wherein the communication interface comprises, a Universal asynchronous receiver/transmitter, Serial Peripheral Interface Bus, Inter-Integrated Circuit, Controller Area Network bus or Ethernet interface, or a debug interface.

8. The processing system according to claim 6, wherein the digital component comprises a hardware timer, a counter or a cryptographic co-processor.

9. The processing system according to claim 6, wherein the analog component comprises a comparator or a sensor.

10. A processing system comprising:
    a digital processing unit programmable as a function of a firmware stored to a non-volatile memory;
    a resource connected to the digital processing unit via a communication system; and
    a time reference circuit comprising a first digital counter circuit configured to generate, in response to a clock signal, a system time signal comprising a plurality of bits indicative of a time tick-count;
    a time base distribution circuit configured to generate a time base signal by selecting a subset of the bits of the system time signal, wherein the time base signal is provided to the resource; and
    an operation time counter circuit comprising a plurality of third digital counter circuits configured to generate, in response to the clock signal or a trigger signal generated by the first digital counter circuit, respective count values, wherein each of the plurality of third digital counter circuits may be reset, started and stopped by the digital processing unit.

11. The processing system according to claim 10, wherein in response to a power-on reset or destructive reset, the digital processing unit configures one or more of the plurality of third digital counter circuits.

12. The processing system according to claim 11, wherein the digital processing unit configures one or more of the plurality of third digital counter circuit by reading an initial count value from a non-volatile memory of the processing system and writing the initial count value to a selected counter of the plurality of third digital counter circuits.

13. The processing system according to claim 12, wherein the selected counter is configured for increasing a count value in response to a new count event.

14. The processing system according to claim 10, wherein the resource is configured to:
   detect a given event,
   store the time base signal to a register in response to the event, and
   signal the event to the digital processing unit, and
   wherein the digital processing unit is adapted to, in response to the event having been signaled by the resource, read via the communication system the time base signal from the register.

15. The processing system according to claim 10, wherein the resource comprises one of:
   a communication interface;
   an analog-to-digital converter or a digital-to-analog converter;
   a digital component;
   an analog component; and
   an analog/digital mixed signal component.

16. The processing system according to claim 15, wherein the communication interface comprises, a Universal asynchronous receiver/transmitter, Serial Peripheral Interface Bus, Inter-Integrated Circuit, Controller Area Network bus or Ethernet interface, or a debug interface.

17. The processing system according to claim 15, wherein the digital component comprises a hardware timer, a counter or a cryptographic co-processor.

18. The processing system according to claim 15, wherein the analog component comprises a comparator or a sensor.

19. A method comprising:
   providing a digital processing unit programmable as a function of a firmware stored to a non-volatile memory;
   providing a resource connected to the digital processing unit via a communication system;
   providing a time reference circuit comprising a first digital counter circuit to generate, in response to a clock signal, a system time signal comprising a plurality of bits indicative of a time tick-count, wherein the first digital counter circuit comprises a first register for storing an increment value, a summer having a first input coupled to the first register, a second register having a first input coupled to an output of the summer, a second input for receiving the clock signal, and an output coupled to a second input of the summer for generating the system time signal; and
   providing a time base distribution circuit to generate a time base signal by selecting a subset of the bits of the system time signal, wherein the time base signal is provided to the resource, and wherein the resource:
   detects a given event,
   stores the time base signal to a register in response to the event, and
   signals the event to the digital processing unit, and
   wherein the digital processing unit, in response to the event having been signaled by the resource, reads via the communication system the time base signal from the register.

20. A method comprising:
   providing a digital processing unit programmable as a function of a firmware stored to a non-volatile memory;
   providing a resource connected to the digital processing unit via a communication system;
   providing a time reference circuit comprising a first digital counter circuit configured to generate, in response to a clock signal selected from a plurality of input clock signals, a system time signal comprising a plurality of bits indicative of a time tick-count;
   providing a time base distribution circuit to generate a time base signal by selecting a subset of the bits of the system time signal, wherein the time base signal is provided to the resource, and wherein the resource:
   detects a given event,
   stores the time base signal to a register in response to the event, and
   signals the event to the digital processing unit, and
   wherein the digital processing unit, in response to the event having been signaled by the resource, reads via the communication system the time base signal from the register.

* * * * *